United States Patent [19]

Schaefer

[11] 3,919,978
[45] Nov. 18, 1975

[54] DIRECT KENNEL EXHAUST SYSTEM
[75] Inventor: Dora B. Schaefer, New York, N.Y.
[73] Assignee: Puppy Palace Enterprises, Inc., Lake Saint Louis, Mo.
[22] Filed: July 10, 1974
[21] Appl. No.: 487,144

[52] U.S. Cl. .................................. 119/19; 119/17
[51] Int. Cl.² .................................... A01K 1/02
[58] Field of Search ............ 119/19, 15, 17, 18, 22, 119/21

[56] References Cited
UNITED STATES PATENTS
2,335,173   11/1943   Corey ................................. 119/21
2,857,880   10/1958   Stone, Jr. ........................ 119/19 X
3,220,383   11/1965   Bruner ................................ 119/17
3,731,657    5/1973   Alessio ............................... 119/17
3,749,061    7/1973   Connelly ............................. 119/19

Primary Examiner—J. N. Eskovitz
Attorney, Agent, or Firm—James G. Staples

[57] ABSTRACT

A method and system for eliminating odors from excreta and other sources in a retail pet store which includes a unique system of rigid and flexible conduits associated with a plurality of kennel units in a multi-unit, movable kennel structure whereby dissimilar kennel module systems can be quickly arranged using the same basic conduit components.

4 Claims, 4 Drawing Figures

DIRECT KENNEL EXHAUST SYSTEM

This invention relates generally to animal display systems, and specifically to a display system for pet shop use in which odors generated by excreta from the animals and other sources are substantially reduced or entirely eliminated.

BACKGROUND OF THE INVENTION

Many pet stores are uninviting to customers because of the sharp, pungent, disagreeable odor which pervades the store due to odors emanating from the animal display area. This is particularly true with respect to dogs which, by nature, do not have the natural instinct for cleaniness that other animals do, particularly cats. Even if the store owner regularly cleans the display areas or cages one or more times per day it is virtually impossible to eliminate the odors due to the continuous generation of excreta by the animals and, frequently, the poor ventilating characteristics of the store.

The store conditions may also be hazardous to the animals' health due to air borne bacteria and other potential disease organisms emanating from the excreta and circulated from cage to cage by the air currents within the store.

Prior efforts to overcome these conditions have often involved simply increasing the ventilation from the store area. Although this moves a greater cubic volume of air per unit time the problem of disagreeable odors permeating the store, including soft goods on display, still persists, and the possibility of spreading disease by air borne organisms derived from the excreta or other sources is not significantly reduced.

SUMMARY OF THE INVENTION

The invention substantially, if not entirely, eliminates the noticeable presence of disagreeable odors in pet stores emanating from the animals, and particularly excreta originated odors. The invention further contributes to the maintenance of sanitary conditions for the animals by eliminating the circulation of air currents capable of spreading disease from one animal to another.

Accordingly, a primary object of the invention is to provide a method of substantially, or entirely, eliminating animal odors generated by the presence of animals in a confined space, such as a retail pet store or a boarding kennel.

Another object is to provide a method of reducing the potentially unsanitary environment in a confined space, such as a pet store or boarding kennel, resulting from the generation of sources of disease associated with the animals, such as excreta.

Another object is to provide a controlled environment in a pet kennel which includes a duct system that enables odors generated by pet excreta to be moved directly to a remote exhaust zone, thereby by-passing the working area outside the kennel whereby disagreeable odors in said working area are avoided.

A further object is to provide a modularized controlled environment system in a kennel as above described which has the ability to be expanded or contracted at will by simple valve manipulation and/or piping re-arrangement.

Other objects and advantages of the invention will become apparent from the following detailed description thereof.

BRIEF DESCRIPTION OF DRAWINGS

The invention is illustrated more or less diagramatically in the accompanying drawing wherein.

DETAILED DESCRIPTION OF THE INVENTION

Figure 1:
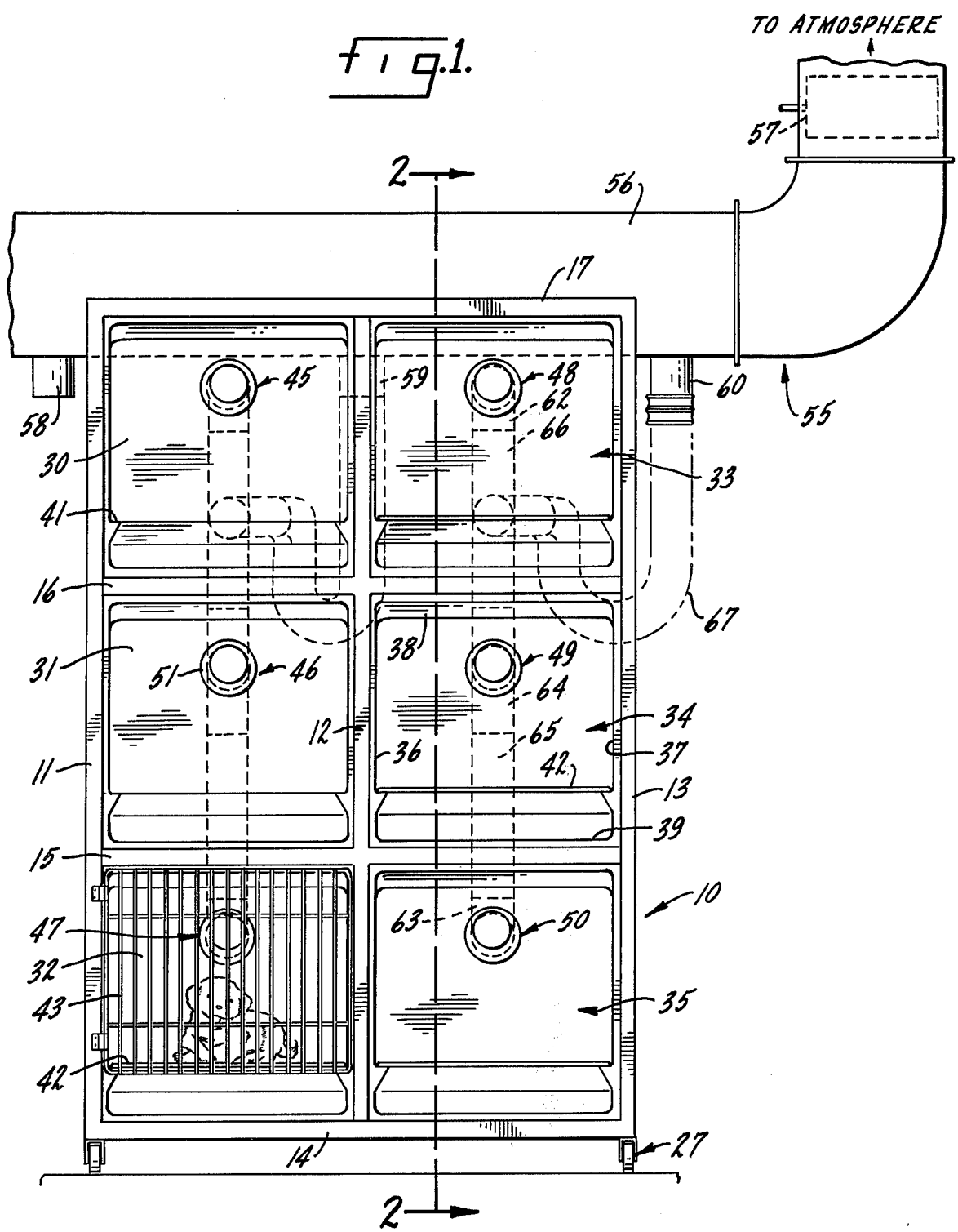
FIG. 1 is a front view of the system of the invention as applied to a multi-unit kennel.

Like reference numerals will be used to refer to like parts from Figure to Figure in the following detailed description of the invention.

Figure 2:
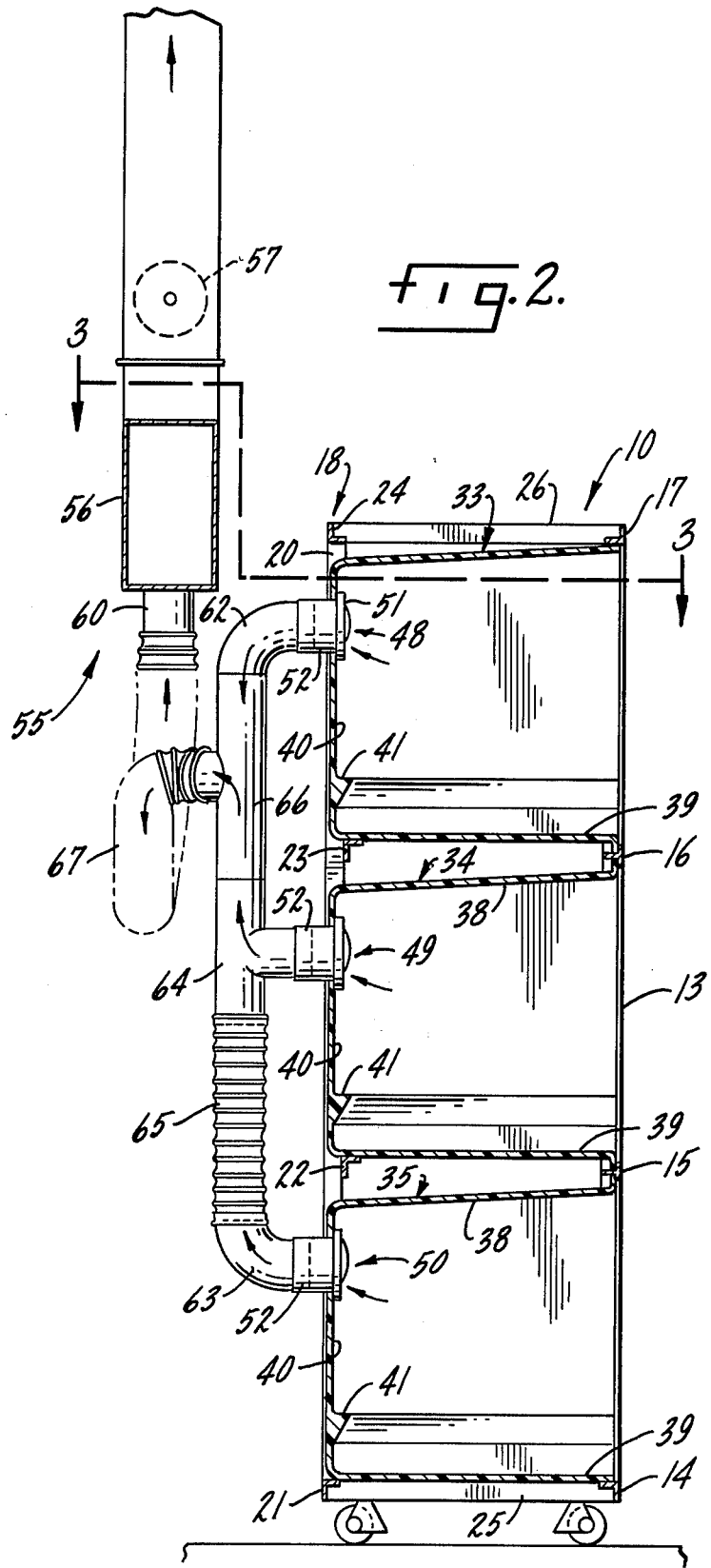
FIG. 2 is a view taken substantially along the line 2—2 of FIG. 1.
Figure 3:
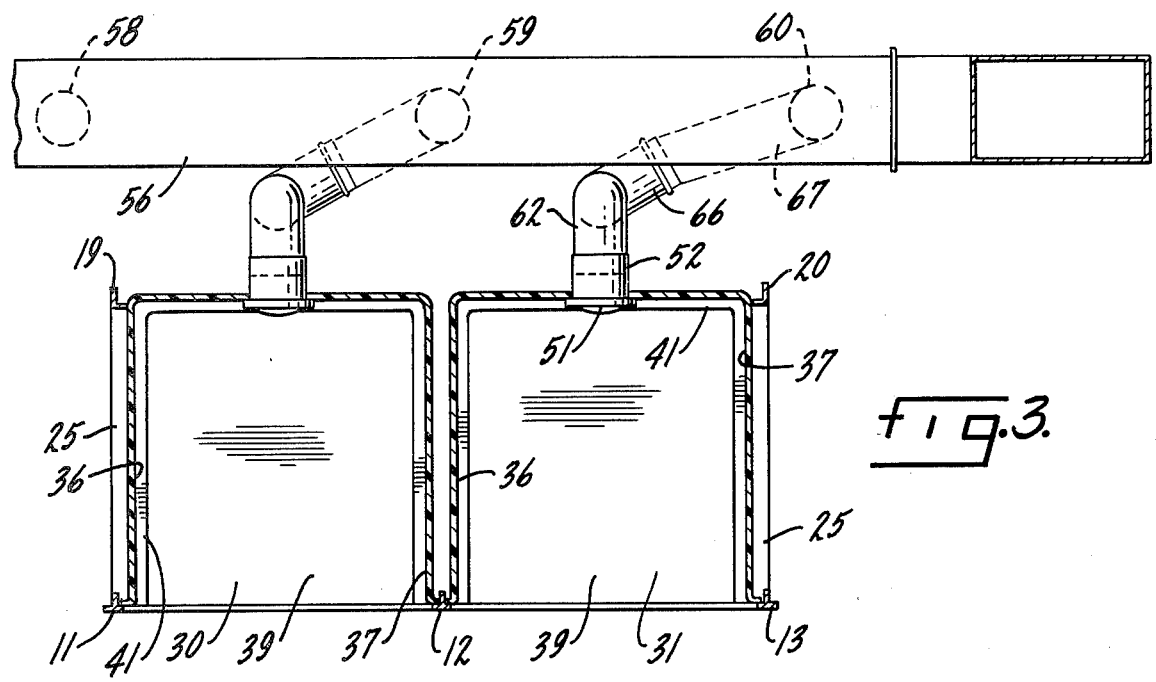
FIG. 3 is a view taken substantially along the line 3—3 of FIG. 2.

Referring first to the embodiment of FIGS. 1–3, and specifically to FIG. 1, a dog kennel system is there illustrated in which odors emanating from excreta and other sources are discharged directly to atmosphere, thereby avoiding the working space in which the kennel is located, such as the interior of a pet store.

The kennel system comprises a frame structure, indicated generally at 10, which includes a front frame grid consisting of vertical uprights 11, 12, and 13, and horizontal cross bars 14, 15, 16 and 17.

A rear frame grid is indicated generally at 18 in FIG. 2, said rear frame grid including rear vertical uprights 19, 20 and integral horizontal cross bars 21, 22, 23 and 24. It will be noted from FIG. 3 that the rear frame grid does not contain a center vertical upright for purposes which will appear hereinafter.

The front and rear grids are secured in spaced relation to one another by a series of horizontal depth spacer members indicated at 25 and 26 in FIG. 2. The frame structure is provided with means for enabling it to be easily moved from location to location, which in this instance comprises wheel assemblies, one of which is indicated generally at 27.

A plurality of kennel units, in this instance six, are indicated at 30–35 respectively. Each kennel unit includes side walls 36, 37, top wall 38, bottom wall 39 and rear wall 40.

Each of side walls 36, 37 and, if desired, rear wall 40, may have formed therein a ledge 41. A wire grid or screen which is slightly smaller in dimension than the horizontal dimensions of the interior of each kennel unit is indicated at 42 in FIG. 1, said grid forming a false bottom for supporting the animal on display therein. It will be understood that the spacing between the individual grid wires is sufficiently wide to enable excreta, food and other matter to pass through to the solid bottom 39 where it is available for easy clean out.

A wire mesh door is indicated generally at 43. Any suitable latch or locking device, not shown, may be employed to prevent unintended opening of the door, such as might occur where the animals bump against it during play. The door will of course be composed of individual wires spaced as fas apart as possible for the purpose of display of the animal.

The rear wall of each kennel unit 30–35 is apertured to receive an exhaust register assembly, indicated generally at 45–50, inclusive. Each register assembly includes a register 51 which is easily insertable into and removable from a duct collar 52 which is permanently affixed to the rear wall 40 of each kennel.

It will thus been seen that each kennel unit is, in effect, a housing having an open access end and an exhaust outlet located in an opposite end, with all housings being arranged in substantial parallelism with the access end of each opening in the same direction and lying in substantially the same frontal plane.

An exhaust system is indicated generally at 55. The exhaust system includes a primary header 56 which discharges to atmosphere. Means for generating a pressure differential between the air inlets to the header and the discharge end of the header is indicated at 57. In this instance a simple blower fan has been shown.

A plurality of header inlets are indicated at 58, 59 and 60, each inlet being a stub collar which opens into the header 56.

The individual kennel units are connected to the discharge header 56 by a collector system which includes collector conduits connected, at their inlet ends, to the duct collars 52 at the rear of each kennel unit, and, at their outlet ends, to an inlet 58, 59 or 60 of the discharge duct.

Referring first to FIG. 2 it will be noted that a branch collector duct system is there illustrated which includes elbow ducts 62 and 63 connected to the duct collars of kennels 33 and 35 respectively. A "T" 64 is connected to the duct collar 52 of kennel 34. Elbow 63 is connected to "T" 64 by a flexible conduit 65, and elbow 62 is connected to "T" 64 by another "T" shaped member 66. The outlet end of "T" 66 is connected by another flexible conduit 67 to inlet 60 of the discharge header 56.

Figure 4:
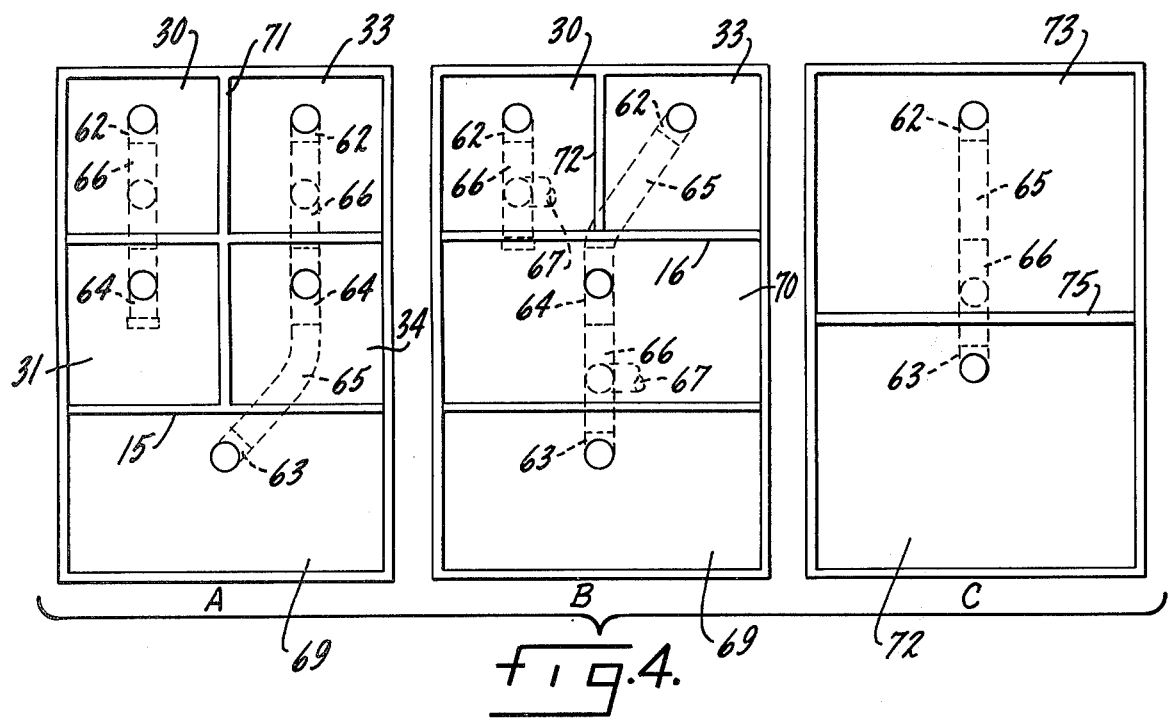
FIG. 4 is a view, schematic in nature, of alternate embodiments, or modules, of the invention.

Referring now to FIG. 4 it will be noted that the kennel system of FIG. 4A includes, in its upper two-thirds, four kennel units, each being equivalent in size and configuration to kennel units 30–35, of the embodiment of FIGS. 1–3, and, in its lower one-third, a large kennel indicated generally at 69. In order to provide unobstructed access to the interior of the lower, larger kennel 69, the middle front upright 71 has been terminated at the level of horizontal cross bar 15.

In the embodiment of FIG. 4B two large kennel units 69, 70 have been illustrated beneath two smaller kennel units 30, 33, this modification being made possible by terminating the middle front upright 72 at the level of horizontal cross bar 16.

And in FIG. 4C two extra large kennels 73, 74 have been illustrated. In this instance the four edge members of the front frame grid, that is, sides 11, 13, bottom 14 and top 17, have been retained but a single divider 75 located midway between the top and bottom has been provided to form the two extra-large kennel units.

It will be noted that in the modules of FIG. 4A and FIG. 4B, kennel units substantially twice as large as the individual kennel units 30–35 inclusive of FIG. 1 have been provided, and in the module of FIG. 4C, two kennel units approximately three times the size of each kennel units 3–35 have been provided. However, irrespective of the number of kennel units or of their configuration in a particular kennel system, the same basic exhaust duct system is used.

Thus, for example, in the module of FIG. 4A a collector system consisting of elbow 62, "T" 64 and "T" 66 may be used to connect kennels 30 and 31. The lower end of connecter "T" 64 need merely be capped off. The remaining three kennels 33, 34 and 69 may then be exhausted from a duct system which, in side view, would appear very similar to the duct system of the embodiment shown in FIG. 2, with flexible conduit section 65 compensating for the vertical misalignment between the exhaust registers of kennel units 33, 34 and 69.

In the module of FIG. 4B, kennel 30 may be exhausted by a duct system consisting of elbow 62 and "T" 66, with the lower end of "T" 66 capped off. Kennel units 33, 70 and 69 may be similarly connected to an inlet of the discharge header by the use of a duct system similar to FIG. 2, except inverted.

The kennel system of FIG. 4C can be connected to an inlet of the exhaust duct with the use of elbow 62, elbow 63, flexible conduit 65 and "T" 66, with the discharge end of conduit 65 connected to an inlet end of "T" 66.

Although the front frame grid center vertical upright in the modules of FIGS. 4A, 4B and 4C have been illustrated as shortened, or eliminated, as contrasted to upright 12 of FIG. 1, it will be understood that the larger sized kennel units may be used in the frame structure of FIG. 1 since the collars 52 are associated with the kennel units, and not the frame structure.

The use and operation of the invention is as follows.

Odors generated by animals on display in one or more of kennel units 30–35 of the embodiment of FIGS. 1–3 are exhausted to the atmosphere via the duct system illustrated best in FIG. 2. That is, excreta and other odor generating materials, such a spilled food, are drawn out the rear wall of each kennel unit, as indicated by the arrows in FIG. 2, into the duct system. The odor laden air follows the path of the arrows to the discharge duct 56 and thence to atmosphere.

In the event it is necessary to move the kennel system for any reason, the flexible conduit 67 permits the structure to be moved forward and backwards for cleaning or other access reasons.

In order to change a kennel, as when a pet is removed and new one is to be placed therein, the exhaust register 51 is snapped out from the front of the kennel, the elbow of "T" at the rear of the system is disconnected from collar 52, and the kennel unit is removed for cleaning or other reconditioning. The same kennel unit or a new one may then be inserted in the same place in the grid system. An exhaust register is then reinserted in the duct collar 52 in the rear of the kennel unit, the exhaust duct system reconnected to collar 52 from the rear, and the structure moved back to its display location in the store.

It will thus be apparent that a simple, economical, and extremely efficient system has been provided for ensuring the maintenance of a sanitary, odor free atmosphere in an animal display area.

Although several embodiments of the invention have been illustrated and described it will at once be apparent to those skilled in the art that further modifications may be made within the spirit and scope of the invention. Accordingly, it is intended the scope of the invention be limited not by the scope of the foregoing description, but solely by the scope of the hereafter appended claims when interpeted in the light of the pertinent prior art.

I claim:

1. In an animal confinement system for use in a confined working space such as the interior of a retail pet store, said confined working space being solely isolated from a fluid discharge zone, such as the atmosphere, the combination of an animal confinement structure located in or adjacent to said confined working space, said confinement structure including a plurality of individual kennel units, said plurality of individual kennel units being carried by a common frame structure, each of said individual kennel units having firstly, animal retention means for receiving and retaining an animal to be displayed, and secondly, receptacle means for receiving and retaining odor generating materials such as animal excreta, whereby each kennel unit has a separate excreta receptacle means which receives excreta and other waste materials only from the associated retention means located thereabove, each of said individual kennel units having a fluid discharge means adapted for connection to a fluid conduit means, fluid conduit means having the discharge end portion thereof communicating with the discharge zone, the intake end portion of the fluid conduit means comprising a plurality of inlets, each inlet being connected to an associated kennel unit fluid discharge means whereby each kennel unit is individually connected into the fluid conduit means irrespective of the number of kennel units comprising said confinement structure, means associated with the fluid conduit means for evacuating the confinement structure whereby odors in the receptacle means are passed directly to the discharge zone from the confinement structure thereby by-passing the confined working space, and further characterized firstly, in that means for movably supporting the animal confinement structure are mounted thereto and said animal confinement structure is movable while said fluid conduit means is in communication therewith, and secondly, in that the fluid conduit means is flexible whereby the fluid conduit means can be operative when the pet confinement structure is moved within the range of movement permitted by the flexible conduit means.

2. The animal confinement system of claim 1 further characterized in that the fluid conduit means includes a header having it downstream outlet end portion discharging to atmosphere, and a plurality of header inlets, each header inlet being connected by branch conduit means to an animal confinement structure, each branch conduit means being flexible whereby the animal confinement structure can be maintained in fluid communication with the header in a plurality of positions of the confinement structure with respect to the header, and means for generating a pressure differential between each header inlet and the oulet end portion of the header whereby the atmosphere in each animal confinement structure is discharged directly to atmosphere, said means for generating a pressure differential in the header being located downstream from the header inlet closest to the outlet end portion.

3. The animal confinement system of claim 2 further characterized in that the branch conduit means is connectable to one or more kennel unit fluid discharge means whereby one or more kennel units of the same or dissimilar size can be connected to the branch conduit means.

4. The animal confinement system; claim 2 further characterized in that the fluid discharge means of each kennel unit is connectable and disconnectable from a branch conduit means whereby one or more kennel units may be disconnected alternately or simultaneously, and replaced as necessary.

* * * * *